MASK-WORK REGISTRATION DEVICE IN VACUUM DEPOSITION APPARATUS

Filed June 5, 1963 4 Sheets-Sheet 1

INVENTORS
PETER ALBERT WALKER
JOHN LAURENCE CLARKE
BY Hane and Nydick
ATTORNEY

MASK-WORK REGISTRATION DEVICE IN VACUUM DEPOSITION APPARATUS

Filed June 5, 1963 4 Sheets-Sheet 2

INVENTORS
PETER ALBERT WALKER
JOHN LAURENCE CLARKE
BY Hane and Nydick
ATTORNEY

MASK-WORK REGISTRATION DEVICE IN VACUUM DEPOSITION APPARATUS

Filed June 5, 1963 4 Sheets-Sheet 3

INVENTORS
PETER ALBERT WALKER
JOHN LAURENCE CLARKE
BY Hane and Nydick
ATTORNEYS

INVENTORS
PETER ALBERT WALKER
JOHN LAURENCE CLARKE
BY Haire and Nydick
ATTORNEYS United States Patent Office 3,302,609
Patented Feb. 7, 1967

3,302,609
MASK-WORK REGISTRATION DEVICE IN VACUUM DEPOSITION APPARATUS

Peter Albert Walker and John Laurence Clarke, Stevenage, England, assignors to International Computers and Tabulators Limited Filed June 5, 1963, Ser. No. 285,828
Claims priority, application Great Britain, June 8, 1962, 22,248/62
6 Claims. (Cl. 118—49)

Figure 1:
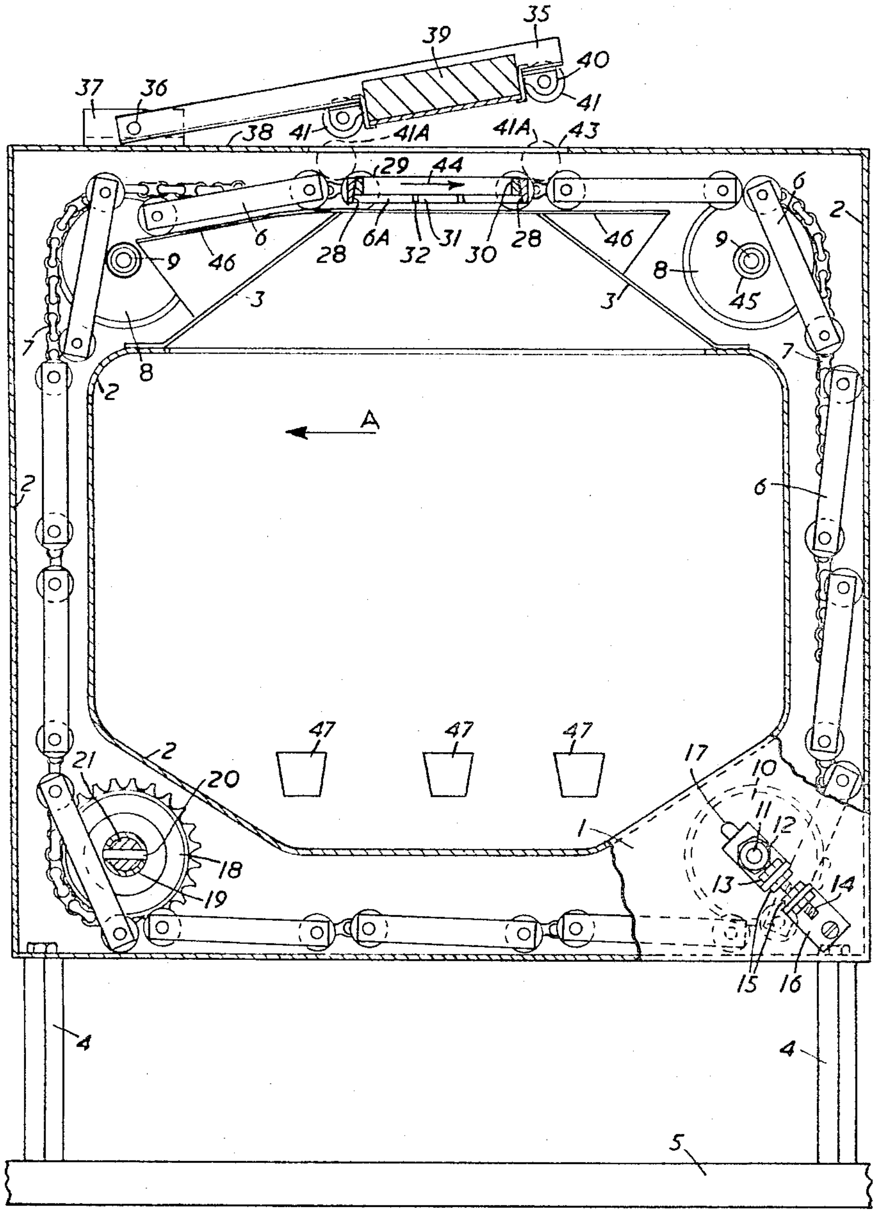

The present invention relates to vacuum deposition apparatus for the deposition of patterns of thin films of material by evaporation from a source through a succession of masks.

It has previously been proposed to deposit thin film patterns onto a supporting substrate by evaporation in vacuo of material from a heated source, the film patterns being determined by suitable masks. Such films may consist, for example, of ferromagnetic materials, dielectric materials and conductive materials to form information storage devices for data processing apparatus. In such cases the ferromagnetic film may be a pattern of discrete film areas arranged in rows and columns, for example, and conductors for the control of such a storage device may be deposited in the form of strip lines of conductive materials linking the ferromagnetic film areas row-by-row and column-by-column. The conductors are usually insulated from the ferromagnetic areas and from each other by films of dielectric material, although it may be desirable that the conductor patterns in one or more layers are interconnected in various ways, in which case various parts of the conductor patterns are required to be masked during the deposition of the dielectric films. It will be seen, therefore, that in order to produce a complex device of this nature it is preferred to carry out the deposition of the various materials in a predetermined order through a corresponding sequence of masks, the entire operation being carried out in a succession of deposition cycles in a vacuum chamber, the chamber being maintained in an evacuated condition throughout the succession. Other devices than the storage devices referred to above are also produced in a somewhat similar manner. For example, cryogenic devices for use in data processing apparatus consist of films of various conductive materials deposited in various patterns and insulated by patterns of deposited dielectric films, all the film patterns being supported on a substrate.

Previously proposed apparatus for selecting a succession of masks in this way has required that the masks are supported in order about the periphery of a horizontal disc mounted beneath the substrate, the masks being swung in turn into position beneath the substrate, between the substrate and the required material vapour source. Because the masks are carried at the periphery of the disc, this has required that the substrate is positioned vertically above the mask path, that is, towards the edge of the disc. Consequently, the vacuum chamber, which is usually in the form of a glass bell jar, has been required to be considerably larger in diameter than the mask-carrying disc, with the result that the volume of the chamber is correspondingly increased and the difficulties inherent in evacuating the chamber and maintaining it in a highly evacuated uncontaminated state are similarly increased.

It is an object of the present invention to provide vacuum deposition apparatus having an improved mask selection device.

According to the present invention, vacuum deposition apparatus for forming a series of patterns of films deposited by evaporation from fixed sources on to a supporting substrate includes a number of masks supported in line on a carrier following a closed path enclosing the sources, means for advancing the carrier to bring the selected ones of said masks in succession to an operational position between the substrate and the fixed sources; and means to effect registration of the masks with the substrate.

Figure 2:
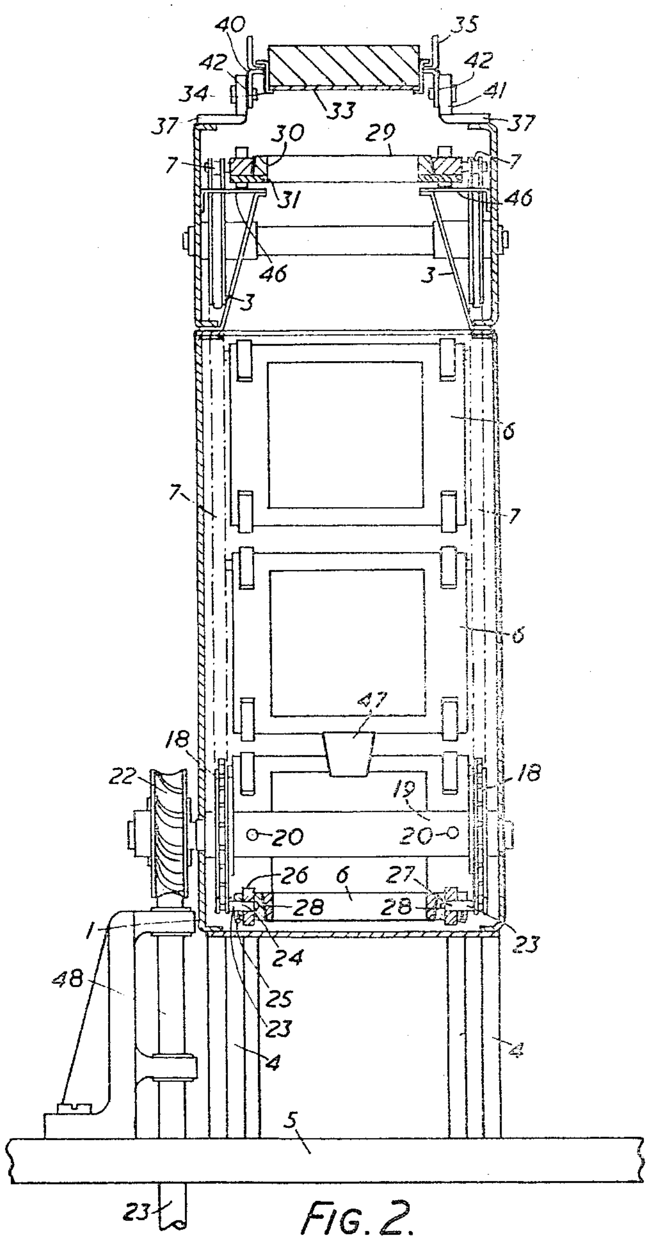
Figure 3:
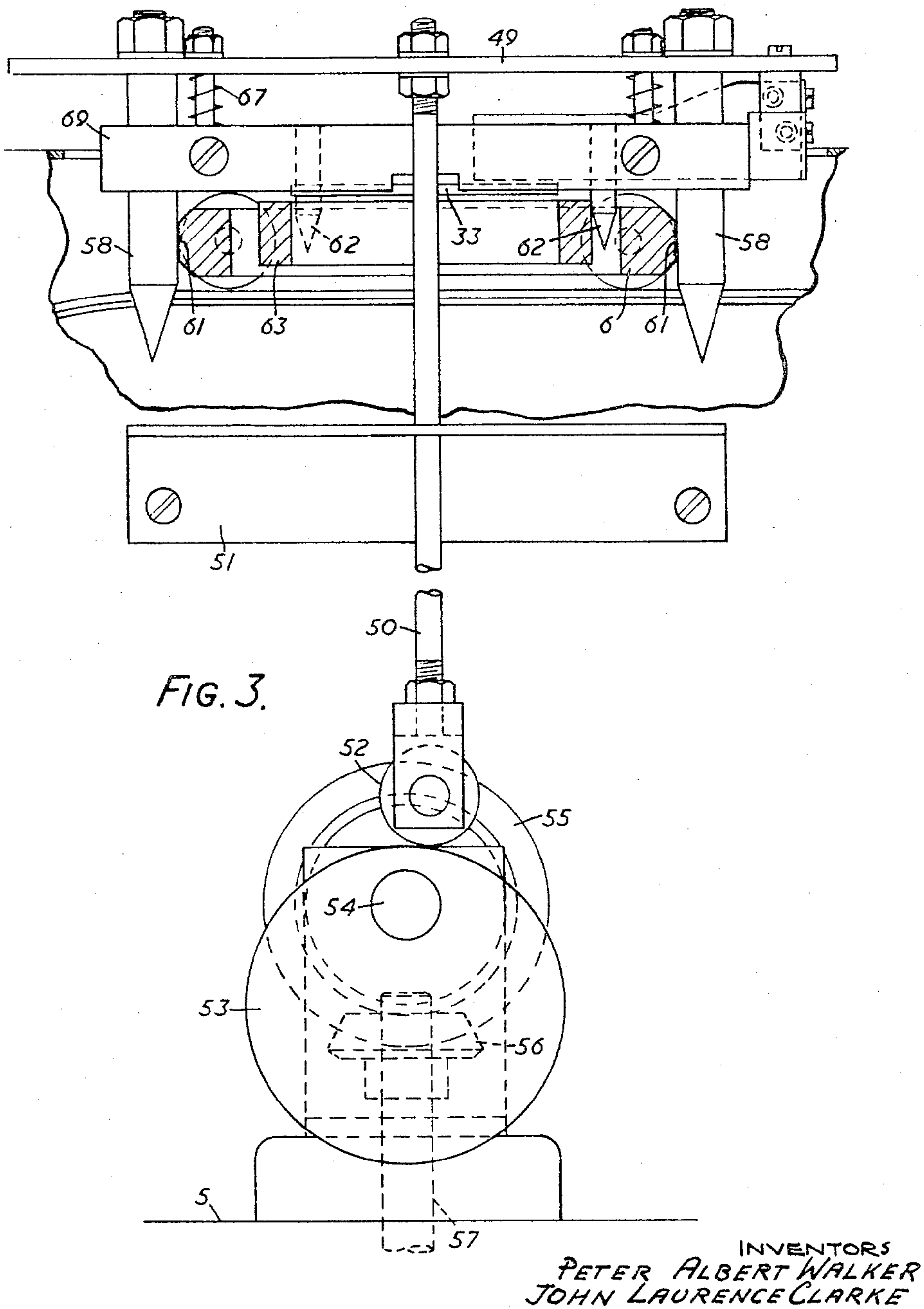
Figure 4:
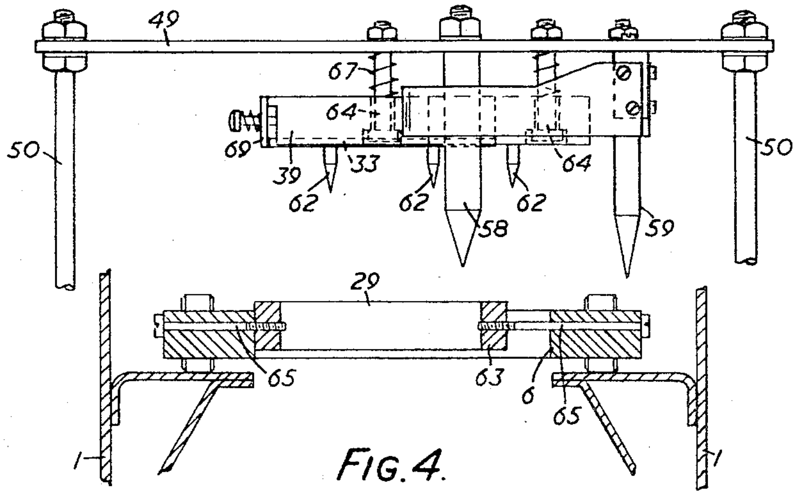
Figure 5:
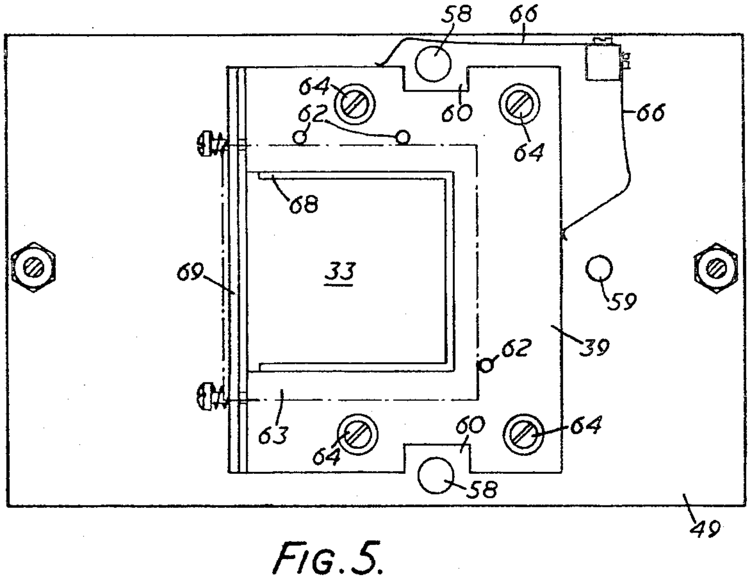

Apparatus embodying the present invention will now be described with reference to the accompanying drawings, in which, FIGURE 1 is a partly sectional view of a masking arrangement for a vacuum deposition apparatus, FIGURE 2 is another partly sectional view of the arrangement of FIGURE 1 taken in the direction of arrow A with the inner spacing plate 2 removed, FIGURE 3 is a part sectional front view of a modified construction of the masking arrangement shown in FIGURES 1 and 2, FIGURE 4 is a part sectional end view showing the substrate holder when raised out of engagement with the mask holder, FIGURE 5 is an underneath plan view of the substrate holder of the modified construction.

Referring now to the drawings, a substrate masking arrangement is supported in a fabricated assembly comprising two apertured face plates 1 spaced apart by spacing plates 2 to form a four sided open structure, the sides and bottom of which are of box section. The top side of the structure is of somewhat similar construction but contains an inverted funnel-like opening 3 formed in the lower spacing plate and an aperture 43 in the upper spacing plate. The entire structure is supported vertically on pillars 4 mounted on the base 5 of a conventional vacuum chamber.

A succession of mask holders 6 are provided, carried between a pair of roller chains 7. The chains are guided in each corner of the structure to follow a continuous path running through the box section limbs of the structure. In the two upper corners of the structure the chain guides are pulleys 8 supported for free rotation on shafts 9 in the face plates 1. In one of the lower corners, the chain guides are similar pulleys 10, but in this case the pulleys 10 are supported on a shaft 11 secured by nuts 12 to brackets 13. The brackets 13 are supported in turn by means of adjusting bolts 14 and nuts 15 to further brackets 16 secured to the face plates 1. Slots 17 are provided in the face plates 1 to allow the shaft 11 to be positioned by adjustment of the nuts 15 in order to take up any slack in the chains 7. In the fourth corner the chain guides are a pair of sprockets 18 fixed to a torque tube 19 and engaged with the chains 7. The torque tube 19 is secured by shear pins 20 to a driving shaft 21, and the shaft 21 is driven by means of suitable gearing 22 from a main shaft 48 extending through the base 5 of the chamber.

Each of the mask holders 6 is attached at its leading edge to the chains 7. For this purpose, suitably spaced pins on the roller chains are extended and extensions 23 so formed are housed in recesses 24 in the mask holders 6. Locking screws 25 are provided to prevent the extensions 23 from becoming disengaged from the holders 6. A pair of rollers 26 is provided at each end of each holder 6 and the rollers are carried on stub spindles 27 housed in the holders.

Each of the mask holders 6 has a rectangular aperture with converging sides 28. A mask 29 is secured across the aperture by means of a clamping frame 30 having sides with a sloping face complementary to the sides 28 of the holder aperture. The mask 29 is clamped on all four sides by the insertion of the frame 30 into the aperture of the holder. The frame 30 is secured in position by means of a clamping strip 31 located in a recess 32 cut in the holder 6.

The substrate 33 upon which a film pattern is to be deposited is held in an open frame 34 supported by a channel-sectioned member 35. The member 35 is supported at the end remote from the substrate frame by a pivot 36 mounted in brackets 37 fixed to the upper-spacing plate 38 of the top side of the structure. The substrate 33 is firmly supported in the frame 34 by means of a heavy block or sole plate 39. A subsidiary framework 40 is secured to the underside of the channel member 35 and carries two pairs of rollers 41 mounted on stub spindles 42. As shown in the drawings, the channel member 35 is in a raised position, but it will be appreciated that, in use, the substrate support block is sufficiently heavy to cause the free end of the channel member 35 to move downward, so that the substrate is lowered through aperture 43 in the top plate. The operational position assumed by a mask holder 6 is indicated in FIGURE 1 by the holder 6A. With the channel member 35 in the downward position, the rollers 41 take up a position indicated by dotted circles 41A one pair of rollers 41 being in front of the leading rollers 26 and the other pair of rollers 41 being at the rear of the trailing rollers 26 of the operational mask. In this position, the co-operation of the rollers 41 and 26 provides the necessary registration of the mask with the substrate and the substrate takes up a position immediately above the mask 29 carried by the operational holder 6A.

It will be apparent that rotation of the sprocket driving wheels 18 causes the mask holders to be moved round the chain path in the supporting structure, thus allowing the masks to be presented in succession at the operational position. The preferred direction of movement of the mask holders is indicated by arrow 44 (FIGURE 1). During this movement the substrate is raised from the mask, leaving the operational position, by the co-operation of the leading rollers 26 of the holder 6 with the outermost rollers 41 of the substrate holder. This upward movement is sustained by the co-operation of the leading rollers 26 of the approaching holder 6 with the intermost rollers 41. As the new holder 6 continues to advance, the innermost rollers 41 track along the upper face of the holder 6. As the next holder 6 arrives at the operational position, the innermost rollers 41 ride over the trailing rollers 26 of the holder and the new mask is again registered by the engagement of the roller pairs 26 and 41 as before.

Since only the leading ends of the mask holders 6 are attached to the chains 7, it is desirable to provide means for guiding the holders into the path to be followed across th upper limb of the structure. Accordingly, rollers 45 are mounted for free rotation on the shafts 9 in the upper corners of the structure. The rollers 45 are spaced to engage the sides of the holders 6. Ramps 46 are also mounted inside the top limb of the structure and form a track for the rollers 26 of the holders 6.

It will be appreciated that the masking apparatus described in the foregoing paragraphs is intended for use in conjunction with otherwise conventional vacuum deposition apparatus. For example, the materials from which films are to be deposited on the substrate 33 are supported for evaporation in sources in the aperture of the structure shown. The position occupied by such sources is diagrammatically indicated in the drawings by the reference 47. It will be realised, however, that such sources may be of any suitable form and that source heating arrangements are provided as is usual in apparatus of this kind. The entire structure is contained within a vacuum chamber (not shown) and the apparatus may include further devices, such as means for heating the substrate or for providing temperature and deposition thickness indications, for example. Such devices are themselves well known in vacuum deposition apparatus for producing deposited film patterns and, since they form no part of the present invention, they will not be further shown or described. However, it is to be understood that vacuum deposition apparatus including the mask carrying structure described may also include such of the conventional auxiliary devices as are required in dependence upon the purpose for which the pattern-coated substrates are required.

Since the vacuum deposition apparatus is operated in the conventional manner, that is, the deposition cycle requires the chamber to be maintained in a highly evacuated state, it is clearly necessary to reduce the risk of contamination from the materials used in the structures contained within the chamber. Accordingly, it is preferred to make all the metal parts of the mask changing structure, with the exception of the masks themselves, of stainless steel, and, to avoid the use of lubricants, the bearings for the various shafts and rollers are preferably of polytetrafluoroethylene.

It will be appreciated from the foregoing description that the mask changing apparatus consists primarily of a number of mask holders which are supported so that they follow a closed path which includes the material sources, that is, the sources are arranged within the path followed by the mask holders. Each mask may then be brought into registration with the substrate in turn. In the apparatus described in the foregoing paragraphs, the arrangements for ensuring correct registration consist of the co-operation of pairs of rollers, and the degree of registration may be determined visually, for example. Where, however, the structure of the vacuum chamber renders this visual examination difficult, the co-operation of the rollers may be determined by electrical means. For example, an interlock contact may be provided and arranged relative to the substrate holder so that it is closed as the substrate holder moves fully downward.

Alternatively, another form of construction shown in FIGURES 3, 4 and 5 may be used to obtain more accurate registration between the mask and substrate. In this case the sole plate 39 carrying the substrate is suspended from a supporting platform 49. The platform 49 is secured to two rods 50 passing downwards through locating brackets 51 fixed to the face plates 1 of the open structure. The lower ends of the rods 50 carry rollers 52 which engage the periphery of cams 53 mounted on a shaft 54. The shaft 54 is operated through bevel gears 55, 56 by a driving spindle 57 extending through the base 5 of the chamber. Thus, turning the driving spindle 57 rotates the cams 53 and by means of the rods 50, raises or lowers the supporting platform 49 vertically with respect to the mask holder 6 at the operational position.

Alignment of the substrate and the mask positioned at the operational position is effected in two stages by means of two sets of tapered pins. Firstly, the mask holder is aligned relative to the platform 49 by one set of pins consisting of two pins 58 and a pin 59, each pin having a coarse taper. These pins 58 and 59 are secured to the platform 49 and project downwards beyond the sole plate 39. Recesses 60 are formed in the sole plate 39 to provide clearance for the tapered pins 58. Initial lowering of the platform 49 causes the pins 58 to engage the leading and trailing edges 61 of the mask holder 6 and the pin 59 to engage in a hole in the mask holder. This engagment of the pins with the mask holder corrects any misalignment of the mask holder.

Secondly, the mask 29 is aligned relative to the substrate 33 by means of a second set of pins 62 which are secured to the sole plate 39 and have a fine taper. The pins 62 project downwards from the sole plate 39 less than the pins 58 and 59 project beyond the sole plate so that during initial lowering of the platform 49 only the pins 58 and 59 engage the mask holder. In this construction, the mask 29 is not clamped in the mask holder, as previously described, but is welded to a frame 63 carried by the mask holder. The frame 63 is mounted in the mask holder by means of screws 65. The sole plate 39 is suspended by dowel screws 64 which are a loose fit in the sole plate thereby allowing limited movement of the substrate 33, relative to the platform 49, parallel to the mask. The sole plate is biassed in mutually perpendicular directions by leaf springs 66 so that on continued downward movement of the platform 49 the pins 62 engage two outer edges of the frame 63, as indicated by the broken line in FIG. 5, and thereby bring the mask and the substrate into registration with one another.

Alternatively the frame 63 may be mounted with limited freedom of movement in the mask holder with spring biassing.

Since the sole plate 39 is not rigidly fixed to the platform 49 but is suspended by means of the dowel screws 64 the sole plate is not moved downwards positively. However if desired helical springs 67 may be placed around the dowel screws 64 to bias the sole plate downwards. Similarly the platform 49 may be biassed downwards by springs.

The substrate 33 is held in a rebate 68 in the sole plate 39 by means of a spring biassed retaining strip 69.

If desired means may be provided for indicating which mask holder is positioned in the operational position. Such means may, for example, consist of contacts arranged in coded formation on the mask holder.

What is claimed is:

1. Vacuum deposition apparatus, including means to support a substrate within a vacuum chamber; a plurality of sources of material for the vacuum deposition of films on said substrate; a plurality of masks each mounted in a mask holder; chain means encircling said sources and arranged to move said mask holders in turn into a predetermined position between said sources and said substrate, said mask holders having leading and trailing edges relative to the direction of movement and being pivotally attached to said chain means at said leading edges; means to guide said trailing edges of said mask holders; and engaging means to engage said substrate supporting means with that mask holder which is at said predetermined position to effect registration of the mask relative to said substrate, said substrate supporting means being movable towards said mask holder to effect said engagement.

2. Apparatus as claimed in claim 1, in which said chain means includes a pair of parallel endless chains to both of which chains said mask holders are pivotally attached.

3. Apparatus as claimed in claim 1, in which said leading and trailing edges of said mask holders are provided with guide rollers, and in which said engaging means includes at least one member which locates between the guide rollers of adjacent mask holders.

4. Apparatus as claimed in claim 3, in which said member which locates between the guide rollers is a tapered pin.

5. Apparatus as claimed in claim 1, in which said masks are mounted with limited freedom of movement in said mask holders, and in which said engaging means includes tapered pins mounted on said substrate supporting means to engage said mask holder and said mask, respectively.

6. Apparatus as claimed in claim 1, in which said substrate supporting means includes a first member; and a second member mounted with limited freedom of movement on said first member and arranged to carry said substrate; and in which said engaging means includes tapered pins mounted on said first and second members, respectively, to engage, respectively, said mask holder and mask.

References Cited by the Examiner

UNITED STATES PATENTS

| | | | |
|---|---|---|---|
| 1,156,446 | 10/1915 | Taylor et al. | 198—145 |
| 1,343,184 | 6/1920 | Baker et al. | 198—131 X |
| 1,785,833 | 12/1930 | Keck | 101—122 |
| 3,145,829 | 8/1964 | Janouschek et al. | 198—131 X |
| 3,207,126 | 9/1965 | Byron | 118—49 |

FOREIGN PATENTS

| | | |
|---|---|---|
| 138,390 | 8/1901 | Germany. |

MORRIS KAPLAN, *Primary Examiner.*